(12) United States Patent
Raio et al.

(10) Patent No.: US 6,332,768 B1
(45) Date of Patent: Dec. 25, 2001

(54) DOUGH PRESS WITH INTERCHANGEABLE PERIMETER EDGE MOLDS

(75) Inventors: Eugene Louis Raio, Palm Desert; Steven M. Raio, Yorba Linda, both of CA (US)

(73) Assignee: Proprocess Corporation, Paramount, CA (US)

( * ) Notice: Subject to any disclaimer, the term of this patent is extended or adjusted under 35 U.S.C. 154(b) by 0 days.

(21) Appl. No.: 09/137,774

(22) Filed: Aug. 26, 1998

Related U.S. Application Data

(63) Continuation-in-part of application No. 08/777,485, filed on Dec. 30, 1996, now Pat. No. 5,800,844.

(51) Int. Cl.⁷ .............................. A21C 11/00; B30B 15/14
(52) U.S. Cl. ......................... 425/152; 425/167; 425/408; 99/432
(58) Field of Search .............................. 99/432; 425/183, 425/193, 394, 152, 167

(56) References Cited

U.S. PATENT DOCUMENTS

| | | | |
|---|---|---|---|
| 3,068,778 | 12/1962 | Majerus | 99/375 |
| 3,108,533 | 10/1963 | Read et al. | 100/98 |
| 3,565,015 | 2/1971 | Jorgensen | 107/15 |
| 3,761,216 | 9/1973 | Duarte et al. | 425/214 |
| 3,814,005 | 6/1974 | Widdel | 99/349 |
| 3,947,204 | 3/1976 | Ayres et al. | 425/383 |
| 4,060,365 | 11/1977 | Duarte et al. | 425/214 |
| 4,303,677 | 12/1981 | De Acetis | 426/27 |
| 4,417,867 | 11/1983 | Bauer | 425/394 |
| 4,508,025 | 4/1985 | Schultz | 99/353 |
| 4,511,324 | 4/1985 | Bauer | 425/398 |
| 4,559,002 | 12/1985 | Atwood | 425/152 |
| 4,634,365 | 1/1987 | Triporo et al. | 425/398 |
| 4,973,240 | 11/1990 | Reilly | 425/195 |
| 5,135,036 | 8/1992 | Caron | 144/286 |
| 5,417,149 | 5/1995 | Raio et al. | 99/349 |
| 5,469,779 | 11/1995 | Amore et al. | 99/349 |

*Primary Examiner*—Nam Nguyen
*Assistant Examiner*—Thukhanh T. Nguyen
(74) *Attorney, Agent, or Firm*—Stetina Brunda Garred & Brucker

(57) ABSTRACT

A dough press machine for flattening a quantity of dough. The dough press machine comprises a housing having lower and upper platens attached thereto. Releasably attached to the lower platen is a mold which defines a peripheral edge. The mold is sized relative to the lower platen such that the lower platen protrudes beyond the peripheral edge of the mold. The quantity of dough is placable onto the mold, with the movement of at least one of the lower and upper platens toward the other facilitating the compression of the quantity of dough between the upper platen and the mold and the movement of a portion of the quantity of dough over the peripheral edge of the mold into contact with the lower platen.

13 Claims, 2 Drawing Sheets

DOUGH PRESS WITH INTERCHANGEABLE PERIMETER EDGE MOLDS

RELATED APPLICATIONS

The present application is a continuation-in-part of U.S. application Ser. No. 08/777,485 entitled DOUGH PRESS MACHINE filed Dec. 30, 1996, now U.S. Pat. No. 5,800,844, the disclosure of which is incorporated herein by reference.

FIELD OF THE INVENTION

The present invention relates generally to food processing equipment, and more particularly to a dough press machine for flattening a quantity of dough which includes interchangeable molds selectively attachable to a lower platen thereof for purposes of forming a pie crust of a desired diameter having a raised peripheral edge upon the completion of the flattening process.

BACKGROUND OF THE INVENTION

There is currently known in the prior art different types of dough press machines, each of which is specifically suited for flattening a quantity of dough to facilitate the formation of, for example, a pizza pie crust. Currently known dough press machines typically comprise upper and lower platens which are attached to a support structure so as to be in alignment with each other. The upper platen is usually attached to an element of the support structure which is configured to allow the upper platen to be reciprocally moveable toward and away from the lower platen. Use of the prior art dough press machines is typically accomplished by initially placing a quantity of unformed dough either directly upon the lower platen or upon a carrier such as a pan which is placed upon the lower platen. Thereafter, the upper platen is actuated toward the lower platen so as to flatten the quantity of dough and spread the same radially outward in a manner forming a non-cooked crust having a generally circular shape. In some prior art dough press machines, the upper platen is provided with a heating element to par bake the dough during the crust formation process.

To provide access to the lower platen for the placement and removal of the dough from thereupon, the same is often pivotally or detachably mounted to the support structure of the dough press machine, and is thus movable from a position of vertical alignment with the upper platen to one in which the lower platen is disposed laterally outward relative to the upper platen. Thus, when a quantity of dough is to be flattened through the use of the dough press machine, the lower platen is typically first pivoted outwardly from beneath the upper platen, thus allowing the operator to easily place a quantity of dough upon the lower platen. Thereafter, the lower platen is pivoted back into vertical alignment with the upper platen, which is then actuated so as to move downwardly toward the lower platen in the above-described manner for purposes of flattening the quantity of dough. The reciprocation or upward and downward movement of the upper platen is typically accomplished either hydraulically or pneumatically. After the quantity of dough has been flattened, the lower platen is again pivoted from beneath the upper platen, with the flattened dough being removed from the lower platen and another quantity of dough being placed thereupon for flattening through the repetition of the above-described cycle.

While the prior art dough press machines are generally suitable for flattening a quantity of dough, they possess certain deficiencies in relation to the production of pizza pie crusts which detract from their overall utility. Foremost of these deficiencies is the inability of prior art dough press machines to flatten a quantity of dough in a manner wherein the resultant pizza pie crust formed by the flattening process includes a raised peripheral edge. As is well known to pizza makers, it is generally desirable for the peripheral edge of the pizza pie crust to be provided with a raised peripheral edge or lip for purposes of preventing pizza sauce or other viscous materials used in the pizza preparation from dripping or running over the edge of the crust. Those prior art dough press machines which include structures adapted to facilitate the formation of a raised peripheral edge on the resultant pizza pie crust are generally unable to produce pizza pie crusts of differing diameters.

The present invention addresses and overcomes the above-described deficiencies of prior art dough press machines by providing a dough press machine which is capable of flattening quantities of dough to form pizza pie crusts of any one of a number of differing diameters wherein each pizza pie crust, regardless of its diameter, is formed to include a raised peripheral edge. These and other objects of the present invention, will be described in more detail below.

SUMMARY OF THE INVENTION

In accordance with the present invention, there is provided a dough press machine for flattening a quantity of dough. The dough press machine comprises a housing having lower and upper platens attached thereto. In the present dough press machine, the lower platen is pivotally connected to the housing and movable between an operating position and an access position relative thereto. The upper platen is itself movably attached to the housing and reciprocally movable toward and away from the lower platen. More particularly, the present dough press machine includes a thrust actuator which is attached to the housing, with the upper platen being attached to the thrust actuator and reciprocally movable toward and away from the lower platen thereby. The lower platen defines a generally planar top surface, with the upper platen defining a generally planar bottom surface. Additionally, the lower and upper platens each preferably have a generally circular configuration, and are in substantial coaxial alignment with each other when the lower platen is in the operating position.

The dough press machine of the present invention further comprises a mold which is releasably attached to the lower platen. The mold preferably has a generally circular configuration, and defines a generally planar top surface as well as a peripheral edge. In the present dough press machine, the diameter of the mold is less than the diameter of the lower platen such that the top surface of the lower platen extends radially beyond the peripheral edge of the mold when the mold is releasably attached to the lower platen. As will be recognized, the upper platen is in substantial coaxial alignment with the mold when the same is attached to the lower platen and the lower platen is in its operating position.

In the present dough press machine, the lower platen includes a circularly configured opening which extends axially therethrough. Additionally, the mold includes a lock member which extends axially from the bottom surface thereof and has a size and configuration which is complementary to that of the opening. The receipt of the lock member into the opening facilitates the releasable attachment of the mold to the lower platen in a manner wherein the mold is prevented from rotating relative to the lower platen.

In addition to the lock member, the mold includes a retainer member which has a generally U-shaped or horseshoe shaped configuration, and is attached to the lock member. The retainer member is engageable to a stop member of the present dough press machine which is attached to the housing. In this respect, the engagement of the retainer member to the stop member facilitates the location of the lower platen in its operating position.

The stop member, in addition to assisting in locating the lower platen to the operating position, also serves as a sensor which is electrically connected to the thrust actuator. In this respect, the stop member/sensor is operable to detect the position of the lower platen and the alignment thereof with the upper platen. More particularly, due to its location upon the housing, the stop member/sensor is able to detect when the lower platen has been pivoted into its operating position, and is operable to prevent the thrust actuator from moving the upper platen toward the lower platen when the lower platen is not in its operating position in substantial alignment with the upper platen.

The dough press machine of the present invention is used by initially moving the lower platen to its access position. Thereafter, a mold of a desired diameter is selected and releasably attached to the lower platen via the receipt of the lock member of the mold into the opening of the lower platen. A quantity of dough is then placed onto the top surface of the mold, with the lower platen then being moved or pivoted to its operating position. The upper platen is then actuated toward the lower platen so as to facilitate the compression of the quantity of dough between the bottom surface of the upper platen and the top surface of the mold. Due to the sizing of the mold relative to the lower platen, such compression results in the radial movement of a portion of the quantity of dough over the peripheral edge of the mold and into contact with the top surface of the lower platen, thus facilitating the formation of a raised peripheral lip on the resultant pizza pie crust.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
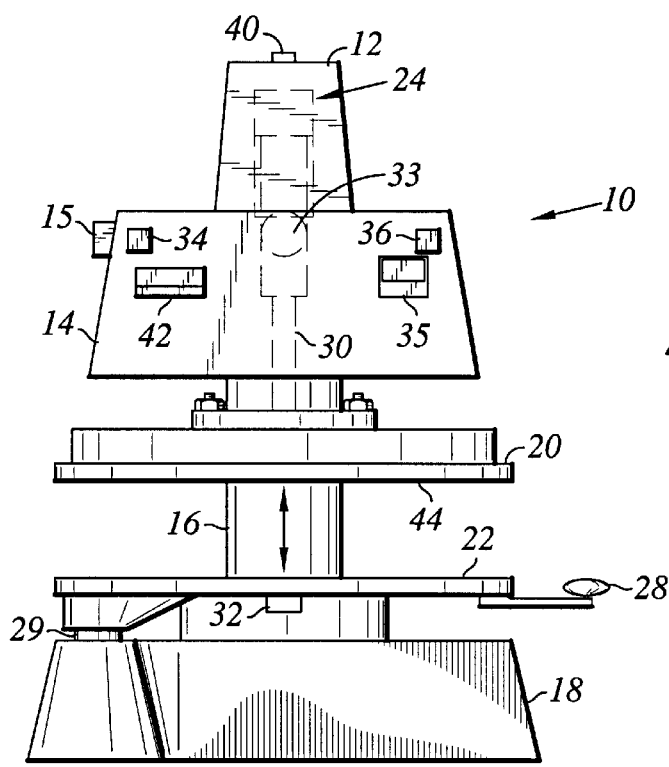
FIG. 1 is a front elevational view of the dough press machine of the present invention.
Figure 2:
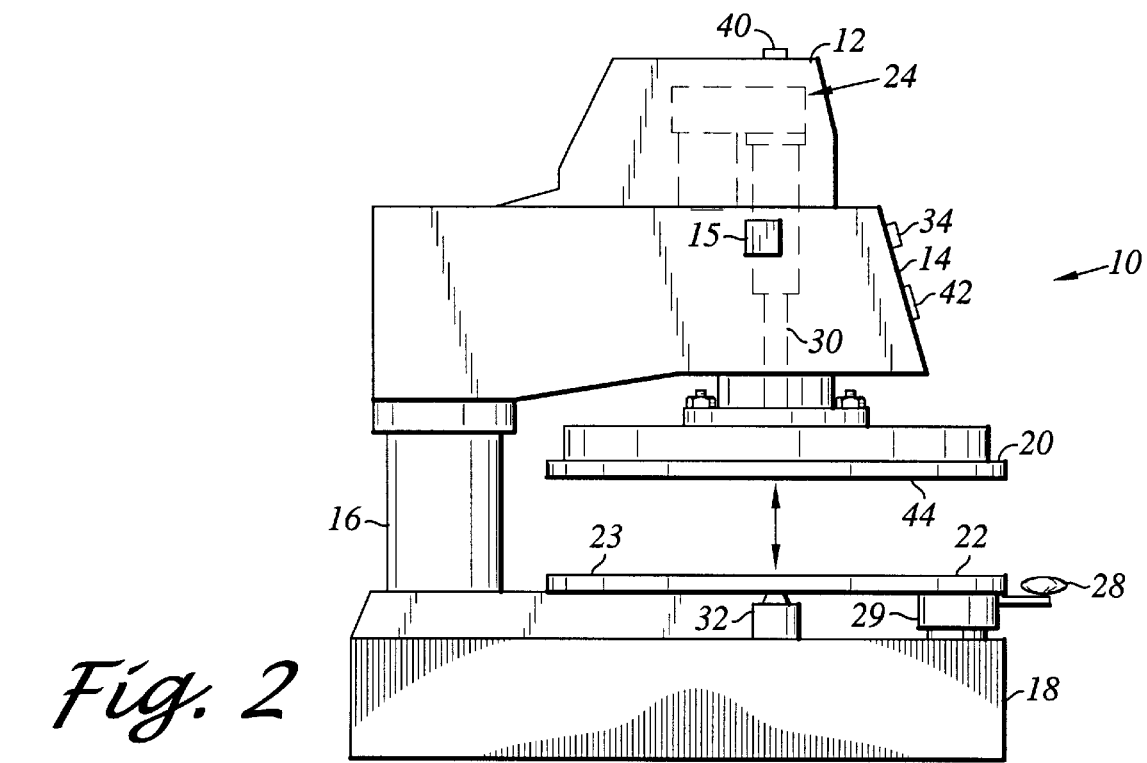
FIG. 2 is a side elevational view of the dough press machine of the present invention.

Referring now to the drawings wherein the showings are for purposes of illustrating a preferred embodiment of the present invention only, and not for purposes of limiting the same, FIGS. 1 and 2 illustrate a dough press machine 10 constructed in accordance with the present invention. The dough press machine 10 finds particular utility in relation to the flattening of a quantity of dough 72 for purposes of forming a circularly configured pizza pie crust. As will be described in more detail below, the dough press machine 10 possesses advantages over those currently known in the prior art, with one such advantage being the ability to provide the resultant pizza pie crust with a raised peripheral edge or lip.

In the preferred embodiment, the dough press machine 10 comprises a housing 11 which itself includes a base 18 having a support post 16 attached thereto and extending upwardly therefrom. Attached to the top end of the support post 16 is an upper compartment 12 of the housing 11 which includes a control panel 14 disposed thereon. Also disposed on the upper compartment 12 is an on/off switch 15, a forwardly facing emergency termination switch 33, an opposed pair of forwardly facing activator switches 34, 36, a forwardly facing timer switch 35, an upwardly directed thickness control knob 40, and a forwardly facing digital temperature indicator 42. The switches 33, 34, 35 and 36 and digital temperature indicator 42 all comprise components of the control panel 14.

The dough press machine 10 further comprises an electric thrust actuator 24 which is disposed within the upper compartment 12 of the housing 11. The thrust actuator 24 includes a reciprocating shaft 30 which protrudes downwardly from the upper compartment 12. The emergency termination switch 33 is electrically connected to the thrust actuator 24 for reasons which will be discussed in more detail below. In the preferred embodiment, the thrust actuator 24 is operable to provide a linear load capacity of about one thousand (1000) pounds.

Referring now to FIGS. 1–6, the dough press machine 10 of the present invention further comprises a circularly configured upper platen 20 which is attached to the distal end of the shaft 30 of the thrust actuator 24, and defines a generally planar bottom surface 44. In addition to the upper platen 20, the dough press machine 10 includes a circularly configured lower platen 22 which defines a generally planar top surface 23. The lower platen 22 is pivotally connected to the base 18 of the housing 11 via a pivot shaft 29 which extends from the bottom surface of a peripheral portion of the lower platen 22. Due to its pivotal connection to the housing 11 via the pivot shaft 29, the lower platen 22 is selectively movable between an operating position and an access position relative to the housing 11. More particularly, when the lower platen 22 is in its operating position as shown in FIG. 1, the upper and lower platens 20, 22 are in substantial vertical alignment with each other (i.e., are in substantial coaxial alignment). When the lower platen 22 is in its access position, it extends laterally outward relative to the upper platen 20, thus providing easy access to the top surface 23 thereof. The movement of the lower platen 22 between its operating and access positions is accomplished through the use of a handle 28 which extends outwardly therefrom.

Figure 4:
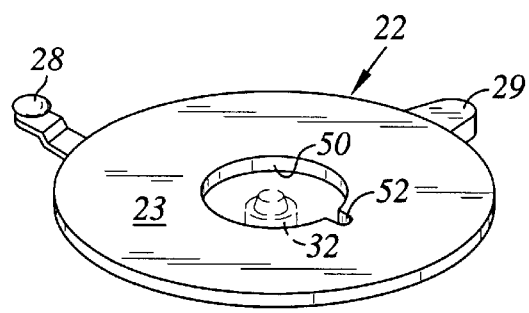
FIG. 4 is a top perspective view of the lower platen of the present dough press machine with the mold removed therefrom.
Figure 6:
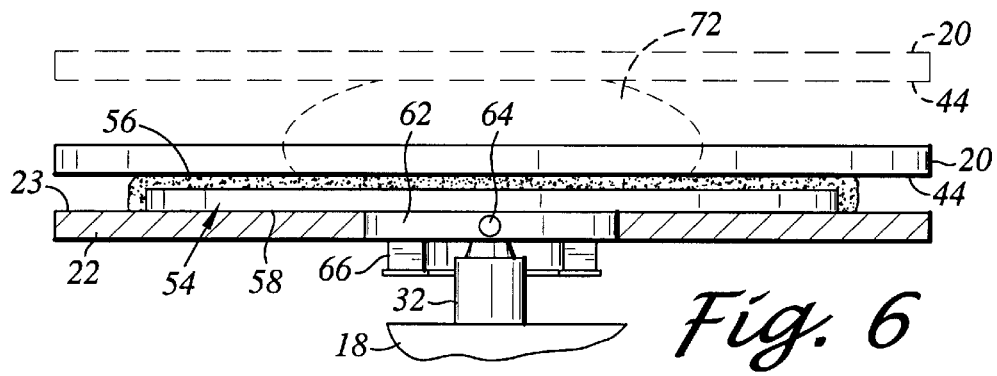
FIG. 6 is a cross-sectional view illustrating the manner in which the mold is attached to the lower platen and a quantity of dough is compressed between the upper platen of the present dough press machine and the mold.

As best seen in FIG. 4, disposed within the center of the lower platen 22 is a circularly configured opening 50 which extends axially therethrough. Disposed within the inner wall of the lower platen 22 which defines the opening 50 therewithin is a radially extending notch 52. As seen in FIG. 6, when the lower platen 22 is in its operating position, the opening 50 is coaxially aligned with the upper platen 20 and shaft 30, as well as a generally cylindrical sensor member 32 which is attached to the base 18 of the housing 11 and extends upwardly therefrom. The sensor member 32 is sized such that it does not protrude into the opening 50 when the lower platen 22 is in its operating position. The use of the sensor member 32, which also functions as a stop member, will also be described in more detail below.

Figure 3:
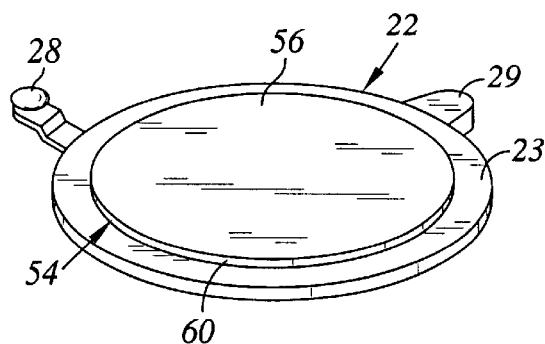
FIG. 3 is a top perspective view of a mold of the present dough press machine as releasably attached to the lower platen.
Figure 5:
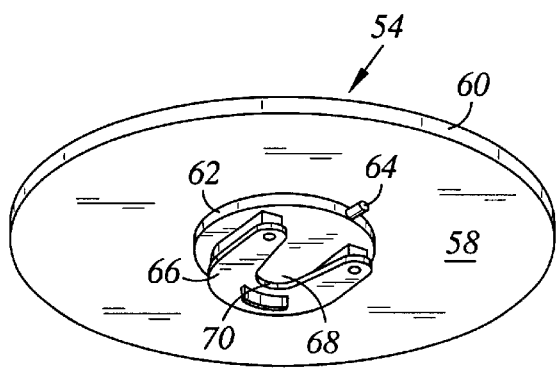
FIG. 5 is a bottom perspective view of the mold shown in FIG. 3.

As best seen in FIGS. 3, 5 and 6, the dough press machine 10 further comprises a circularly configured mold 54 which is releasably attachable to the lower platen 22. The mold 54 defines a generally planar top surface 56, a bottom surface 58, and a continuous peripheral edge 60. The mold 54 includes a lock member 62 which extends axially from the bottom surface 58 thereof and has a size and configuration which is complementary to that of the opening 50 within the lower platen 22. In this respect, the lock member 62 has a circularly configuration which is of a diameter slightly less than the diameter of the opening 50, thus allowing the lock member 62 to be slidably insertable thereinto. Additionally, the lock member 62 includes a pin portion 64 which protrudes radially from the peripheral edge thereof and is sized so as to be receivable into the notch 52 of the opening 50. As will be recognized, the receipt of the pin portion 64 into the notch 52 upon the insertion of the lock member 62 into the opening 50 prevents the rotation of the mold 54 relative to the lower platen 22 when releasably attached thereto.

In addition to the lock member 62, the mold 54 includes a retainer member 66 which is attached to the lock member 62 and has a generally U-shaped or horseshoe shaped configuration. More particularly, the retainer member 66 includes a slot 68 which is defined by an inner edge portion 70 of the retainer member 66. In the dough press machine 10, the retainer member 66 is engagable to the sensor member 32 which, as indicated above, also serves as a stop member. In this respect, the receipt of the sensor member 32 into the slot 68 and abutment of the sensor member 32 against the arcuately contoured section of the inner edge portion 70 defining the back of the slot 68 facilitates the location of the lower platen 22 to its operating position.

The dough press machine 10 of the present invention is used by initially turning the on/off switch 15 to the on position so as to provide power to all of the electrical components of the dough press machine 10, including the thrust actuator 24. Though not shown, the upper platen 20 is preferably provided with an internal heating element which is activated by the actuation of the on/off switch 15 to the on position. Subsequent to the activation of the dough press machine 10, the handle 28 is grasped so as to facilitate the pivotal movement of the lower platen 22 to its access position. Thereafter, a mold 54 of a desired diameter is selected and releasably attached to the lower platen 22 via the receipt of the lock member 62 and accompanying pin portion 64 into the opening 50 and notch 52 of the lower platen 22 in the above-described manner. In this respect, the mold 54 may be provided in any one of a number of different diameters, including diameters of 8, 10, 12, 14, 16 or 18 inches. Importantly, as indicated above, the diameter of the lower platen 22 exceeds the diameter of the largest mold 54 which may be releasably attached to the lower platen 22. As such, when the mold 54 is releasably attached to the lower platen 22, a portion of the top surface 23 of the lower platen 22 will protrude radially beyond the peripheral edge 60 of the mold 54.

Subsequent to the releasable attachment of the mold 54 to the lower platen 22, a quantity of dough 72 is placed onto the approximate center of the top surface 56 of the mold 54. Thereafter, the handle 28 is re-grasped by the user and used to pivotally move the lower platen 22 back to its operating position such that both the lower platen 22 and mold 54 are in substantial coaxial alignment with the upper platen 20. As previously explained, the lower platen 22 is located into its operating position by the receipt of the sensor member 32 into the slot 68, and more particularly the abutment of the sensor member 32 against the arcuately contoured section of the inner edge portion 70 which defines the back of the slot 68. When the lower platen 22 is returned to its operating position, the top end of the sensor member 32 is disposed immediately adjacent the lock member 62 of the mold 54.

Upon the return of the lower platen 22 to its operating position, the thrust actuator 24 is actuated so as to cause the upper platen 20 to move downwardly toward the lower platen 22. The actuation of the thrust actuator 24 is accomplished by simultaneously pressing the activator switches 34, 36. Importantly, the sensor member 32 is electrically connected to the thrust actuator 24, and will not allow the upper platen 20 to be moved downwardly upon the simultaneous pressing of the activator switches 34, 36 unless the sensor member 32 senses or determines that the lower platen 22 including the mold 54 releasably attached thereto is in the operating position.

The actuation of the upper platen 20 downwardly toward the lower platen 22 facilitates the compression of the quantity of dough 72 between the bottom surface 44 of the upper platen 20 and the top surface 56 of the mold 54 in the manner shown in FIG. 6. Due to the sizing of the mold 54 relative to the lower platen 22, such compression results in the radial movement of a portion of the quantity of dough 72 over the peripheral edge 60 of the mold 54 and into contact with the top surface 23 of the lower platen 22, thus facilitating the formation of a raised peripheral lip on the resultant pizza pie crust.

The length of time at which the bottom surface 44 of the upper platen 20 applies compressive pressure to the quantity of dough 72 may be selectively varied through the use of the timer switch 35 of the control panel 14, and is typically in the range of about 5 to 7 seconds to cause the quantity of dough 72 to flatten in the above-described manner. As will be recognized, upon the completion of the flattening process, the upper platen 20 is moved or reciprocated vertically upwardly by the thrust actuator 24 back to its original, unactuated position. The distance of downward travel of the upper platen 20 by the thrust actuator 24 may be selectively adjusted via the thickness control knob 40 attached to the upper compartment 12 of the housing 11. As will be recognized, as the distance of downward travel of the upper platen 20 increases, the width of the space defined between the bottom surface 44 of the upper platen 20 and top surface 56 of the mold 54 decreases, thereby resulting in a thinner crust produced by the flattening process. The temperature of the upper platen 20 may be observed from the digital temperature indicator 42 of the control panel 14, and may be selectively increased or decreased depending on whether it is desired to par-bake the pizza pie crust formed through the flattening process. The actuation of the termination switch 33 at any time during the cycling of the dough press machine 10 immediately causes the thrust actuator 24 to return the upper platen 20 to its retracted or unactuated position.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A dough press machine for flattening a quantity of dough, the dough press machine comprising:

a housing;

a lower platen attached to the housing;

an upper platen attached to the housing; and a mold releasably attached to the lower platen and defining a peripheral edge, the mold being sized relative to the lower platen such that the lower platen protrudes beyond the peripheral edge of the mold;

the quantity of dough being placable onto the mold, with the movement of at least one of the lower and upper platens toward the other facilitating the compression of the quantity of dough between the upper platen and the mold and the movement of a portion of the quantity of dough over the peripheral edge of the mold into contact with the lower platen.

2. The dough press machine of claim 1 wherein:

the lower platen has a circular configuration and is of a first diameter; and the mold has a circular configuration and is of a second diameter which is less than the first diameter such that the lower platen extends radially outward from the peripheral edge of the mold.

3. The dough press machine of claim 2 wherein:

the lower platen includes an opening which extends axially therethrough; and the mold includes a lock member which extends axially therefrom and has a size and configuration complementary to that of the opening;

the receipt of the lock member into the opening facilitating the releasable attachment of the mold to the lower platen.

4. The dough press machine of claim 3 wherein:

the lower platen is pivotally connected to the housing and movable between an operating position and an access position relative thereto; and the upper platen is movably attached to the housing and reciprocally moveable toward and away from the lower platen;

the upper and lower platens being substantially aligned with each other when the lower platen is in the operating position.

5. The dough press machine of claim 4 wherein:

the lower platen and the mold each define a planar top surface; and the upper platen defines a planar bottom surface;

the movement of the upper platen toward the lower platen subsequent to the placement of the quantity of dough onto the top surface of the mold facilitating the compression of the quantity of dough between the bottom surface of the upper platen and the top surface of the mold and the movement of a portion of the quantity of dough over the peripheral edge of the mold into contact with the top surface of the lower platen.

6. The dough press machine of claim 5 wherein the upper platen has a circular configuration and is in substantial coaxial alignment with the lower platen and the mold when the lower platen is in the operating position.

7. The dough press machine of claim 4 further comprising a stop member attached to the housing for assisting in locating the lower platen to the operating position.

8. The dough press machine of claim 7 wherein the mold includes a retainer member which is attached to the lock member and engagable to the stop member, the engagement of the retainer member to the stop member facilitating the location of the lower platen in the operating position.

9. The dough press machine of claim 8 wherein:

the upper platen is attached to a thrust actuator and reciprocally movable toward and away from the lower platen thereby; and the stop member includes a sensor which is electrically connected to the thrust actuator for detecting the position of the lower platen and the alignment thereof with the upper platen;

the sensor being operable to prevent the thrust actuator from moving the upper platen toward the lower platen when the lower platen is not in the operating position in substantial alignment with the upper platen.

10. The dough press machine of claim 4 further comprising a thrust actuator attached to the housing, the upper platen being attached to the thrust actuator and reciprocally movable toward and away from the lower platen thereby.

11. The dough press machine of claim 10 further comprising:

a sensor attached to the housing and electrically connected to the thrust actuator for detecting the position of the lower platen and the alignment thereof with the upper platen;

the sensor being operable to prevent the thrust actuator from moving the upper platen toward the lower platen when the lower platen is not in the operating position in substantial alignment with the upper platen.

12. A method for flattening a quantity of dough through the use of a dough press machine including a lower platen pivotally movable between an operating position and an access position, an upper platen reciprocally movable toward and away from the lower platen, and a mold which defines a peripheral edge and is releasably attachable to the lower platen, the method comprising the steps of:

(a) moving the lower platen to the access position;

(b) releasably attaching the mold to the lower platen;

(c) placing the quantity of dough onto the mold;

(d) moving the lower platen to the operating position; and (e) actuating the upper platen toward the lower platen so as to facilitate the compression of the quantity of dough between the upper platen and the mold and the movement of a portion of the quantity of dough over the peripheral edge of the mold into contact with the lower platen.

13. The method of claim 12 wherein the mold has a circular configuration and step (b) comprises selecting the diameter of the mold based on the desired diameter of the flattened quantity of dough.

* * * * *